US012722087B2

(12) United States Patent
Otomo

(10) Patent No.: US 12,722,087 B2
(45) Date of Patent: Sep. 1, 2026

(54) RECORDING MEDIUM AND INFORMATION PROCESSING DEVICE

(71) Applicant: SEGA CORPORATION, Tokyo (JP)

(72) Inventor: Takahiro Otomo, Tokyo (JP)

(73) Assignee: SEGA CORPORATION, Tokyo (JP)

( * ) Notice: Subject to any disclaimer, the term of this patent is extended or adjusted under 35 U.S.C. 154(b) by 259 days.

(21) Appl. No.: 18/612,057

(22) Filed: Mar. 21, 2024

(65) Prior Publication Data

US 2024/0226752 A1 Jul. 11, 2024

Related U.S. Application Data

(63) Continuation of application No. PCT/JP2022/025685, filed on Jun. 28, 2022.

(30) Foreign Application Priority Data

Oct. 19, 2021 (JP) ................................ 2021-170703

(51) Int. Cl.
*A63F 13/00* (2014.01)
*A63F 13/69* (2014.01)
*A63F 13/792* (2014.01)

(52) U.S. Cl.
CPC ............ *A63F 13/69* (2014.09); *A63F 13/792* (2014.09)

(58) Field of Classification Search
None
See application file for complete search history.

(56) References Cited

U.S. PATENT DOCUMENTS

| | | | |
|---|---|---|---|
| 10,238,958 B2 * | 3/2019 | Inagaki | A63F 13/58 |
| 10,366,566 B1 * | 7/2019 | Pascal | G07F 17/3255 |
| 2005/0192082 A1 * | 9/2005 | Wilson | G07F 17/32 463/20 |
| 2006/0068884 A1 * | 3/2006 | Baerlocher | G07F 17/3265 463/20 |
| 2007/0117615 A1 * | 5/2007 | Van Luchene | A63F 13/35 463/25 |

(Continued)

FOREIGN PATENT DOCUMENTS

| | | |
|---|---|---|
| JP | 6143141 B2 | 6/2017 |
| JP | 2020-171776 A | 10/2020 |

OTHER PUBLICATIONS

Avel Online Official Weblite, May 22, 2018, https://avabel.jp/information/detail/?information_id=4923, retrieved on Sep. 5, 2022 (2 pages).

(Continued)

*Primary Examiner* — Paul A D'Agostino

(74) *Attorney, Agent, or Firm* — Osha Bergman Watanabe & Burton LLP

(57) ABSTRACT

A non-transitory computer readable recording medium stores instructions that cause a computer that executes a game in which a player can acquire paid items by taking a purchase procedure, the instructions causing the computer to execute: storing, in a storage, possessed item information including a paid item possessed by the player and an expiration period of the paid item; automatically consuming the paid item with a lapse of the expiration period and removing the paid item from the possessed item information in the storage; and upon automatically consuming the paid item, granting the player a reward related to the game.

13 Claims, 5 Drawing Sheets

(56) References Cited

U.S. PATENT DOCUMENTS

2009/0318213 A1* 12/2009 Wright .................. G07F 17/329 463/17
2010/0216542 A1* 8/2010 Van Luchene .......... A63F 13/12 463/43
2012/0077599 A1* 3/2012 Van Luchene ........ A63F 13/533 463/42
2012/0115597 A1* 5/2012 Waugaman ............. A63F 13/34 463/31
2013/0231999 A1* 9/2013 Emrich .............. G06Q 30/0271 705/14.43
2015/0269813 A1* 9/2015 Severance ........... G07F 17/3288 463/9
2017/0072320 A1* 3/2017 McMain ............... A63F 13/335
2018/0093187 A1* 4/2018 Mabuchi ............... A63F 13/795
2018/0093188 A1* 4/2018 Mabuchi ................. A63F 13/60
2018/0144584 A1* 5/2018 Chan ................... G07F 17/3211
2018/0211342 A1* 7/2018 Hoareau .............. G06Q 50/184
2018/0221769 A1* 8/2018 Kosai .................... H04L 67/125
2018/0293608 A1* 10/2018 Li ......................... G06F 3/0488
2019/0374857 A1* 12/2019 Deller ..................... G06T 13/40
2021/0069585 A1* 3/2021 Iguchi ................. G07F 17/3244
2023/0271088 A1* 8/2023 Keller ................... A63F 13/216 463/29
2024/0220324 A1* 7/2024 Talavera ............... G06F 9/4401
2024/0226752 A1* 7/2024 Otomo .................. A63F 13/792
2024/0261692 A1* 8/2024 Sliwka .................. H04L 9/3213
2024/0428306 A1* 12/2024 Sliwka .................. H04L 9/0891

OTHER PUBLICATIONS

Flower Knight Girl Wiki, May 6, 2021, https://web.archive.org/web/20210506034710/https://wikiwiki.jp/flower2ch/%E3%82%B7%E3%83%A7%E3%83%83%E3%83%97, retrieved on Sep. 5, 2022 (2 pages).

International Search Report issued in corresponding International Application No. PCT/JP2022/025685 mailed Sep. 13, 2022 (7 pages).

Written Opinion issued in corresponding International Application No. PCT/JP2022/025685 mailed Sep. 13, 2022 (4 pages).

* cited by examiner

60

Award Notification 47 paid items were automatically consumed due to the elapse of the expiration period.

Lottery game results

62

Result of ownership frame increase

Character ownership frame: 520 → 530

Confirm

64

RECORDING MEDIUM AND INFORMATION PROCESSING DEVICE

TECHNICAL FIELD

The present invention relates to a recording medium storing instructions and an information processing device.

DESCRIPTION OF RELATED ART

There are conventional games in which paid items that can be acquired by a purchase procedure by a player and free items that can be acquired by executing the game can be consumed, with no distinction between the two.

In this regard, Patent Literature 1 discloses a technique in which paid items are consumed preferentially when the player owns both paid items and free items.

PATENT LITERATURE

Patent Literature 1: Japanese Patent No. 6143141

Technological Problem to be Solved by the Invention

With a gaming technology such as this, expiration periods (such as six months or one year) are sometimes set for paid items. Accordingly, the player has to be careful not to let a purchased paid item expire, which is a problem in that the player may hesitate to purchase paid items.

SUMMARY

One or more embodiments of the present invention provide a technological improvement over such conventional gaming technologies discussed above. In particular, one or more embodiments of the present invention provide an information processing device and a recording medium storing instructions that grant a player a reward related to a game while automatically consuming a paid item with a lapse of an expiration period. This enables ensuring an available capacity of a storage while giving satisfaction to the player by granting the reward. Also, the player can be motivated to purchase the paid item even though the paid item is consumed with the lapse of the expiration period.

According to a first mode of the present invention, a non-transitory computer readable recording medium stores instructions for a computer that executes a game in which a player can acquire paid items by taking a purchase procedure, the instructions causing the computer to execute: storing, in a storage, possessed item information including a paid item possessed by the player and an expiration period of the paid item; automatically consuming the paid item with a lapse of the expiration period and removing the paid item from the possessed item information including in the storage; and upon automatically consuming the paid item, granting the player a reward related to the game.

Also, in a second mode of the present invention, the reward does not have an expiration period.

Also, in a third mode of the present invention, the storage stores player information for the player, and the reward is to change a portion of the player information to be more advantageous for the player.

Also, in a fourth mode of the present invention, the player information includes an ownership frame that is an upper limit of a number of contents that the player can possess, and the reward is to increase the ownership frame.

Also, in a fifth mode of the present invention, the player information includes information indicating whether the player is a special member having paid a fixed fee set at specific intervals, and the reward is to make the player the special member.

Also, in a sixth mode of the present invention, the player information includes the current stamina value upon execution of a quest in the game, and the reward is to increase the current stamina value.

Also, in a seventh mode of the present invention, the game includes a lottery game that gives the player one or more randomly selected contents from a lottery target content group, and the reward is one or more contents drawn in the lottery game.

Also, in an eighth mode of the present invention, the reward is a free item that can be consumed in the game in a same way as the paid item.

Also, in a ninth mode of the present invention, a larger amount of the free item is rewarded than the automatically consumed paid item.

Also, in a tenth mode of the present invention, the reward is a content that can be purchased by consuming the paid item in the game.

Also, in the eleventh mode of the present invention, an amount of the reward is increased in proportion to an amount of the automatically consumed paid item.

Also, the information processing device according to a twelfth mode of the present invention executes a game in which a player can acquire paid items by taking a purchase procedure, the information processing device comprising: a storage that stores possessed item information including a paid item possessed by the player and an expiration period of the paid item; and a control device that: automatically consumes the paid item with a lapse of the expiration period and removes the paid item from the possessed item information in the storage; and upon automatically consuming the paid item, grants the player a reward related to the game.

The above features enable ensuring an available capacity of a storage while giving satisfaction to the player by granting the reward. Also, the player can be motivated to purchase the paid item even though the paid item is consumed with the lapse of the expiration period.

DETAILED DESCRIPTION

Figure 1:
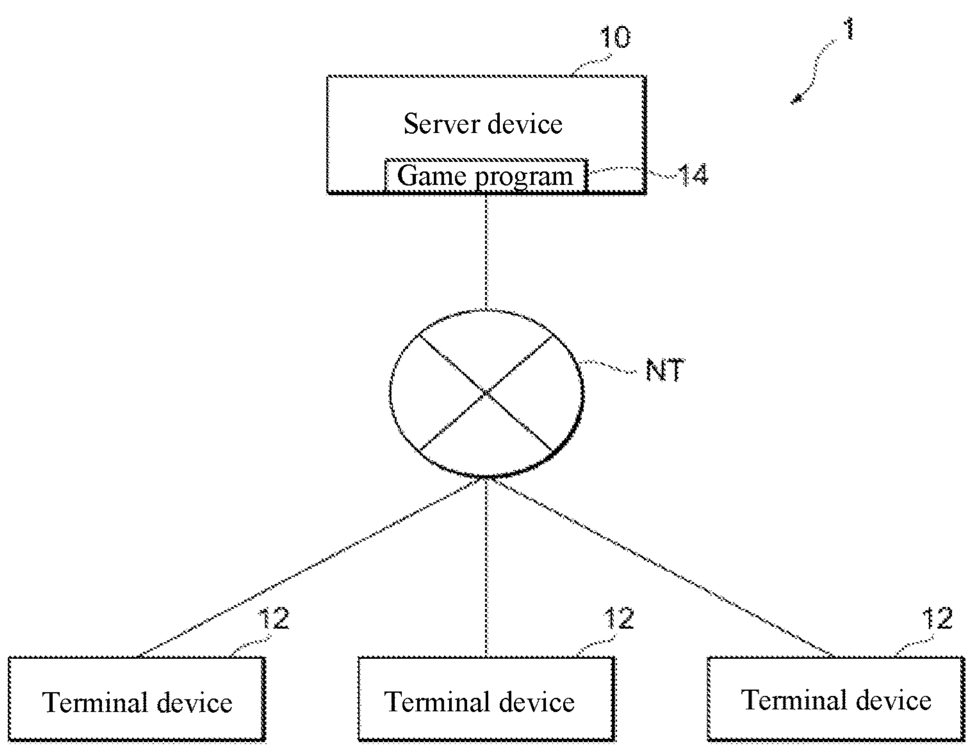
FIG. 1 is a block diagram showing an example of the overall configuration of a game system according to one or more embodiments.

Embodiments of the present invention will now be described with reference to the appended drawings. To facilitate understanding of the description, components and steps that are the same will be numbered the same as much as possible in the drawings, and redundant description will be omitted.

Overall Configuration

FIG. 1 is a block diagram showing an example of the overall configuration of a game system 1 according to one or more embodiments.

As shown in FIG. 1, a game system 1 comprises a server device 10 and one or more terminal devices 12. The server device 10 and terminal devices 12 are connected so as to be able to communicate via a communication network NT such as an intranet, the Internet, or a telephone line.

The server device 10 is an information processing device that provides the execution results of the game obtained by executing instructions such as a game program 14, or the instructions themselves, to the player of each terminal device 12 via the communication network NT. In one or more embodiments, the server device 10 provides the instructions themselves to the players of the terminal devices 12.

Each terminal device 12 is an information processing device belonging to a player, and is an information processing device that provides a game to a player by executing the instructions received from the server device 10 after the instructions have been installed. Examples of these terminal devices 12 include video game machines, arcade game machines, mobile phones, smartphones, tablets, personal computers, and various other such devices.

Hardware Configuration

Figure 2:
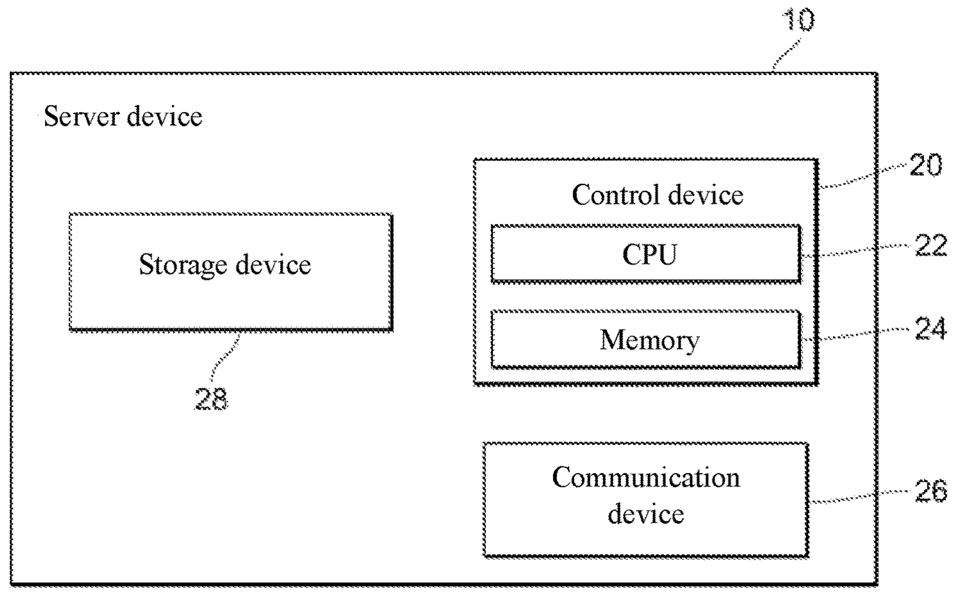
FIG. 2 is a diagram schematically showing an example of the hardware configuration of a server device.

FIG. 2 is a diagram schematically showing an example of the hardware configuration of the server device 10.

As shown in FIG. 2, the server device 10 comprises a control device 20, a communication device 26, and a storage device 28. The control device 20 mainly comprises a CPU (central processing unit) 22 and a memory 24.

In the control device 20, the CPU 22 functions as various functional units by executing specific instructions stored in the memory 24, the storage device 28, or the like. These functional units will be described in detail below.

The communication device 26 is constituted by a communication interface or the like for communicating with an external device. The communication device 26 sends and receives various kinds of information to and from the terminal device 12, for example.

The storage device 28 is constituted by a hard disk or the like. The storage device 28 stores various kinds of instructions and various kinds of information necessary for executing processing in the control device 20, including the game program 14, as well as information about processing results.

The server device 10 can be realized by using an information processing device such as a dedicated or general-purpose server computer. Also, the server device 10 may be constituted by a single information processing device, or may be constituted by a plurality of information processing devices distributed on the communication network NT. Also, FIG. 2 shows only a part of the main hardware configuration of the server device 10, and the server device 10 can comprise other components that are ordinarily provided to a server. Also, the hardware configuration of the plurality of terminal devices 12 may have the same configuration as the server device 10, except for further comprising an operating device, a display device, and a sound output device, for example.

Figure 3:
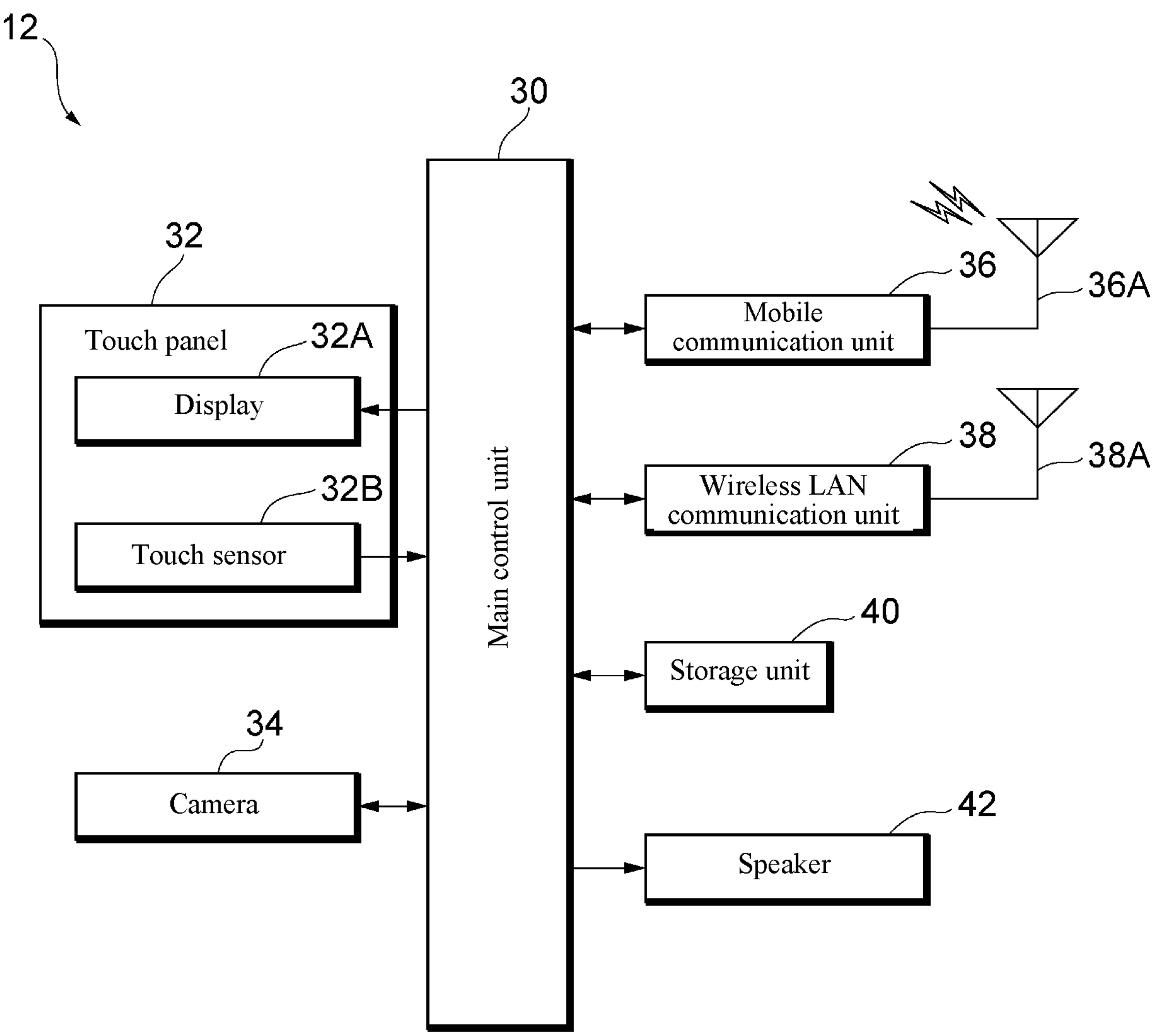
FIG. 3 is a diagram showing an example of the hardware configuration of a smart phone, as the terminal device shown in FIG. 1.

FIG. 3 is a diagram showing an example of the hardware configuration of a smartphone serving as the terminal device 12 shown in FIG. 1.

As shown in FIG. 3, the terminal device 12 comprises a main control unit (controller) 30, a touch panel (touch screen) 32, a camera 34, a mobile communication unit (mobile communication interface) 36, a wireless LAN communication unit (wireless LAN communication interface) 38, a storage unit (storage) 40, and a speaker 42.

The main control unit 30 includes a CPU, a memory, and so forth. This main control unit 30 is connected to the touch panel 32 (used as a display input device), the camera 34, the mobile communication unit 36, the wireless LAN communication unit 38, the storage unit 40, and the speaker 42. The main control unit 30 has the function of controlling these connected devices.

The touch panel 32 has both a display function and an input function, and is constituted by a display 32A that handles the display function, and a touch sensor 32B that handles the input function. In one or more embodiments, the display 32A can display game images including button images, a cross key image, a joystick image, and other such operation input images. The touch sensor 32B can sense the input position of the player with respect to a game image.

The camera 34 has the function of capturing still and/or moving images and storing these images in the storage unit 40.

The mobile communication unit 36 is connected to a mobile communication network via an antenna 36A, and has the function of communicating with other communication devices that are connected to this mobile communication network.

The wireless LAN communication unit 38 is connected to the communication network NT via an antenna 38A, and has the function of communicating with other devices, such as the server device 10, that are connected to the communication network NT.

The storage unit 40 stores various kinds of instructions and data, such as the game program 14, and play data indicating player information or the progress of the game in the instructions. This play data may be stored in the server device 10.

The speaker 42 has the function of outputting game sounds and so forth.

Game Overview

Games according to one or more embodiments include lottery games and quests, which are game types in which a player is allowed to acquire characters as an example of content, purchase games, or the like. These lottery games are sometimes referred to as gacha (loot box), raffle, summoning, or the like. These quests are sometimes referred to as battle games, dungeons, searches, or the like.

A lottery game according to one or more embodiments is a game that gives a player one or more randomly selected characters (contents) from the lottery target character group (content group), in response to an instruction (request) from a player to execute a lottery game. This lottery is executed on the basis of consumption of currency items, gacha tickets, etc., possessed by the player.

Examples of these currency items include charged items (for example, paid stones) and non-charged items (for example, free stones). Charged items are paid items that can be acquired by a purchase procedure (payment) using money, a prepaid card, a credit card, electronic money, crypto assets, or the like. For example, one paid item can be purchased for 100 yen.

A paid item in one or more embodiments is associated with an expiration period. Examples of this expiration period include a period of months (such as six months) or years (such as one year) since the player purchased the paid item. This expiration period may be a period in which the player will have plenty of time to consume paid items in the game, or a period set on the basis of various laws (statutes). Non-charged items are free items that can be acquired by executing a game (such as a login, a quest, a mission, etc.). These free items can be consumed in a same way as paid items in various kinds of games. For example, in the first lottery game according to one or more embodiments, paid items and free items can be consumed, with no distinction between the two. On the other hand, in the second lottery game according to one or more embodiments, free items cannot be consumed, and only paid items can be consumed. Also, in the third lottery game according to one or more embodiments, the consumption amount of paid items that is necessary to execute one lottery is different from the consumption amount of free items. For instance, in the third lottery game according to one or more embodiments, the consumption amount of paid items that is necessary to execute one lottery is set to be smaller than the consumption amount of free items.

Also, a quest according to one or more embodiments is a game in which a team composed of one or more characters possessed by a player and enemy characters play against each other on the basis of an instruction (request) from the player to execute the quest.

For example, in an organization menu for organizing characters to be used in the quest, the player can organize characters to be used in the quest by arbitrarily selecting one or more characters from his or her possessed characters.

These quests are executed on the basis of the consumption of the current stamina associated with the player. When the player clears the quest, that is, when the hit points of an enemy character (boss character) that appears at the end of the quest fall to zero or less, the player can acquire a clearance reward. Examples of this clearance reward include non-charged items (free items), gacha tickets, coins, characters, training items, player experience points, and so forth. An example of a training item is an item for increasing the character experience points of a character. On the other hand, if the player is unable to clear the quest, he or she can choose whether to continue the quest by consuming one currency item (a paid item or free item) or one continuation item, or to give up on clearing the quest.

Also, the purchase game according to one or more embodiments is a game in which a player is allowed to acquire a character (content) selected by the player on the basis of an instruction (request) from the player to purchase a character (content). This purchase is executed on the basis of the consumption of currency items (paid items or free items) possessed by the player. This purchase game differs from a lottery game or a quest in that the player can reliably acquire the desired characters (content).

Also, in the game according to one or more embodiments, if the player is a special member having paid a fixed fee set at specific intervals, the player is provided with a benefit (preferential treatment) that can be used in the game. Examples of this specific interval period include several hours (such as 6 hours), several days (such as 5 days), several weeks (such as one week), and several months (such as one month).

Examples of payment for this fixed fee (such as a monthly fee) include payment using cash, a prepaid card, a credit card, electronic money, crypto assets, or the like.

Examples of benefits (preferential treatment) include non-charged items, the right to play a lottery game (such as a gacha ticket), the right to execute character development (such as a training item), the right to execute stamina recovery (such as a stamina recovery item), the right to execute a continuation (such as a continuation item), the right to increase the ownership frame, characters, and so forth. For example, a player having paid the fixed fee (such as a monthly fee) can obtain (acquire) the benefit by making a request to acquire the benefit at certain fixed intervals (such as daily or every month). In one or more embodiments, a special benefit (preferential treatment) may be provided to a player who has consecutively paid the fixed fee (such as three times in a row). An example of this special benefit is the right to execute a special lottery game in which characters with high rarity are drawn as lottery targets.

Functional Units

Figure 4:
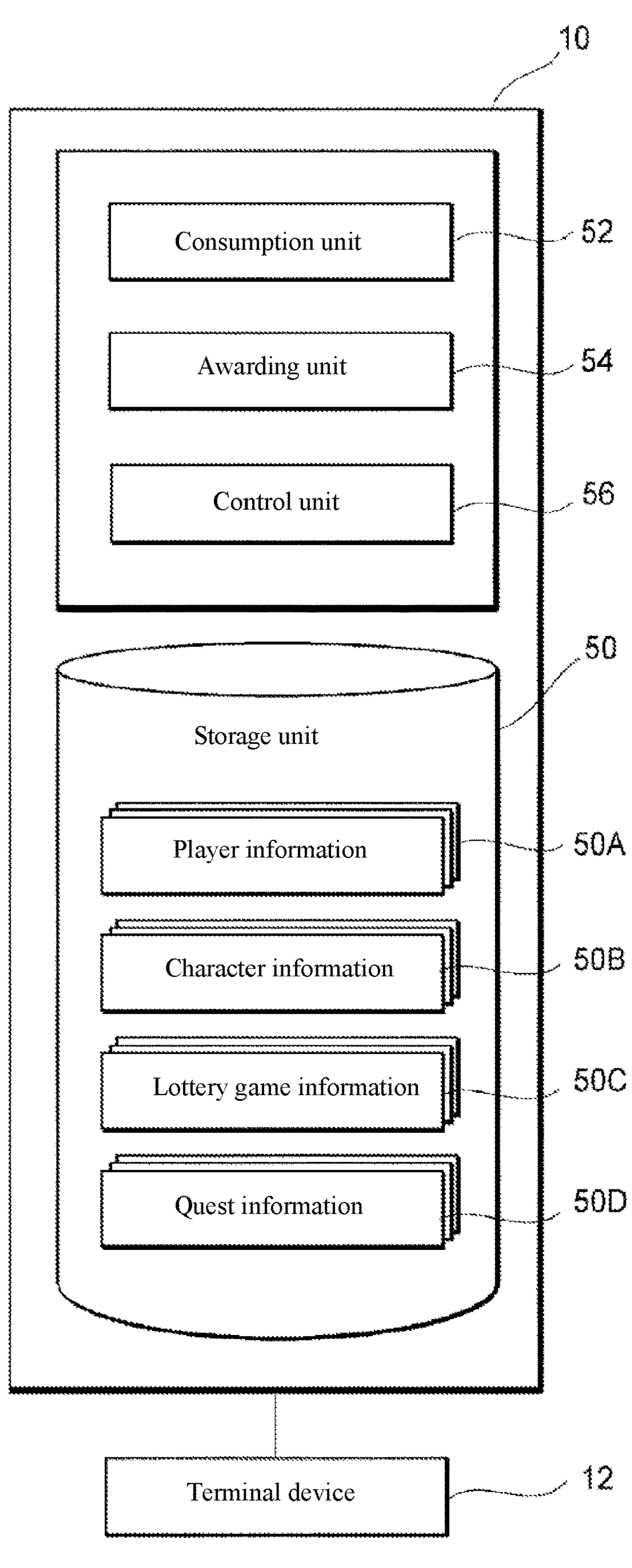
FIG. 4 is a block diagram showing an example of the functional configuration of a server device.

FIG. 4 is a block diagram showing an example of the functional configuration of the server device 10.

As shown in FIG. 4, the server device 10 comprises, as functional components, a storage unit (storage) 50, a consumption unit 52, an awarding unit 54, and a control unit 56. The storage unit 50 is realized in the form of one or more storage devices 28. Functional units other than the storage unit 50 are realized when the control device 20 executes the instructions stored in the storage device 28 or the like.

The storage unit 50 is a functional unit for storing player information 50A, character information 50B, lottery game information 50C, quest information 50D, and so forth.

Player information 50A is stored for each player in association with the player ID of that player. This player information 50A includes, for example, the player's name, age, player rank, possessed content information, membership information, stamina information, and so forth.

The player rank increases when the player acquires player experience points, for example.

Possessed content information includes possessed character information, possessed item information, possessed coin information, and so forth.

Possessed character information includes the character ID of each character possessed by the player, the ability parameters (level, specific parameters, hit points, attack power, defense power, etc.) of each character, and the ownership frame that is the upper limit of the number of characters (contents) that the player can possess. In one or more embodiments, the ownership frame is increased (expanded) by five frames by consuming one currency item (paid item or free item) in response to an instruction from the player, for example.

In one or more embodiments, if the number of characters possessed by the player exceeds the ownership frame, the execution of games (quests and lottery games) in which characters can be acquired is prohibited. Therefore, the player cannot execute a game in which characters can be acquired unless the player increases the ownership frame or decreases the number of possessed characters (by fusing or selling them).

Possessed item information includes the item ID, number, and expiration period for each item possessed by the player. Examples of these items include paid items, free items, gacha tickets, continuation items, stamina recovery items, and so forth. In one or more embodiments, an expiration period is stored in association with a paid item. This expiration period is, for example, six months since the player purchased the paid item. For example, if a player purchased 10 paid items on October 1, the expiration period of the 10 paid items is from October 1 until March 31 of the following year.

Possessed coin information includes the number of coins possessed by the player.

The membership information includes identification information that specifies whether the player is a special member having paid a fixed fee set at specific intervals or is a regular member who has not paid the fixed fee. This fixed fee may be 500 yen, for example. This identification information includes the length of the specific interval period (such as one month) that the player has been identified as the special member. For example, if the player pays the fixed fee for one specific interval period (such as one month), "1" is added to the identification information. Also, if the player pays the fixed fee for three units of the specific interval period (such as three months), "3" is added to the identification information, for example. Also, if the player is a regular member, for example, the identification information includes "0." In one or more embodiments, the identification information is decremented (−1) every time a specific interval period (such as one month) elapses since the time when the player became the special member.

Stamina information includes the player's current stamina value and stamina upper limit value. The current stamina value is the value consumed when the player executes a quest within the game. This current stamina value increases by a specific amount (such as 1) after a certain period of time (such as 3 minutes) elapses, and recovers to the stamina upper limit value. In one or more embodiments, the current stamina value is increased (restored) by a value corresponding to the stamina upper limit value (such as the same amount as the stamina upper limit value) when one currency item (paid item or free item), one stamina recovery item, etc., is consumed in response to an instruction from the player. The current stamina value will be restored above the stamina upper limit value if currency items or stamina recovery items are consumed. This stamina upper limit value may increase along with the player rank, for example.

Character information 50B is stored for each character in association with the character ID of that character. The character information 50B may include, for example, the character name and image, ability parameter information, and rarity. This character information 50B is updated from time to time via a game update by the game operator.

Ability parameter information includes the initial values and maximum values for the various ability parameters of a character.

Rarity may be represented by a number from 1 to 6, for example. This number may be indicated by a number of stars, for example. Here, characters with high rarity are set to have ability parameters or the like that are advantageous for the game (such as in quests).

Lottery game information 50C is stored for each lottery game in association with the lottery game ID of the lottery game. The lottery game information 50C includes the lottery game name and cost, lottery target information, and so forth.

The cost includes the number of currency items (paid items or free items) required to execute one lottery. For instance, the cost for the first lottery game may be five paid items or five free items. Also, for example, the cost for the second lottery game may be five paid items. Also, for example, the cost for the third lottery game may be three items in the case of a paid item, and five items in the case of an free item.

Lottery target information includes the character IDs of the characters constituting the lottery target character group of a lottery game, and the appearance frequency (weighting) associated with that character ID. Appearance frequency may be represented by a number from 1 to 10, for example. The appearance frequency is set to a low numerical value for a character with a high rarity, and to a high numerical value for a character with a low rarity. The appearance frequency may be set to different numerical values among characters of the same rarity (such as a rarity of 6).

Quest information 50D is stored for each quest in association with the quest ID of that quest. The quest information 50D includes the quest name, consumed stamina value, enemy character information, clearance reward information, and so forth.

Consumed stamina value includes the value required to execute the quest. Consumed stamina value is deducted from the player's current stamina value. In one or more embodiments, the higher the difficulty of the quest, the higher the consumed stamina value is, for example.

Enemy character information includes character IDs and ability parameters of the enemy characters that appear in a quest. This enemy character includes a boss character that appears at the end of a quest.

Clearance reward information includes the number of free items or coins that can be earned when a quest is cleared, the character IDs and drop rates of characters that can be earned, player experience points, and so forth. The drop rate is the probability that the player will earn a character. In one or more embodiments, the drop rate includes a probability that is higher for quests with a higher difficulty level.

The consumption unit 52 is a functional unit for consuming currency items possessed by the player. In one or more embodiments, the consumption unit 52 refers to the expiration period of each paid item in the possessed item information of the player information 50A, and compares the expiration period of each paid item with the current date and time. The consumption unit 52 then automatically consumes the paid item as the expiration period elapses. For example, the consumption unit 52 specifies a number n of paid items whose expiration period has elapsed at a specific point (such as at midnight every day), and deletes the specified number n of paid items from the possessed item information.

The awarding unit 54 is a functional unit for granting rewards to the player. In one or more embodiments, the awarding unit 54 grants the player a reward related to the game when a paid item is automatically consumed by the consuming unit 52. Unlike with paid items, this reward is not associated with an expiration period. The reward is determined in advance by the game operator, for example. Examples of this reward may include content, or a change in player information. Specific examples of rewards will be described below.

(1) Change in Player Information

The reward may be that a portion of the player information 50A is changed to be more advantageous for the player, for example. This reward may include increasing the ownership frame of possessed character information in possessed content information, making the player the special member in the membership information (adding a value of 1 or more to identification information), increasing the current stamina in the stamina information, or the like.

(2) Content

The reward may also be content, for example. Examples of this reward (content) may include one or more contents (such as characters) that are automatically drawn in a lottery game, free items that can be consumed in a game (a lottery game, quest, etc.) just the same as paid items, or a content that can be purchased by consuming paid items in a game (a purchase game). Examples of this lottery game include a lottery game that can be executed at the point when a paid item is automatically consumed.

Also, the awarding unit 54 increases the amount of the reward in proportion to the amount (or the number) of paid items automatically consumed. For example, the awarding unit 54 may increase the amount by which the ownership frame is increased, or extend the period in which the player is made the special member (the number of units of a specific interval period, that is, the numerical value added to the identification information), or increase the amount by which the current stamina value is increased, in proportion to the amount of the paid items automatically consumed. Also, for example, the awarding unit 54 may increase the amount of content to be awarded in a lottery game, or increase the amount of free items to be awarded, or increase the amount of content awarded in a purchase game, in proportion to the amount of paid items automatically consumed.

Also, when a paid item is automatically consumed, the awarding unit 54 makes the value of that paid item higher than usual. For example, the awarding unit 54 grants the player a larger amount of (or a larger number of) the free item(s) than the paid item(s) automatically consumed by the consuming unit 52. More specifically, if the number of paid items that have been automatically consumed is 50, the awarding unit 54 grants 75 free items to the player.

Also, for example, the awarding unit 54 usually increases the ownership frame by 5 when one paid item is consumed, but will increase the ownership frame by 6 when one paid item is automatically consumed. Also, for example, the awarding unit 54 usually makes the player the special member for one unit of the specific interval period (such as one month) when 500 yen (equivalent to five paid items) is paid, but will make the player the special member for one unit of the specific interval period (such as one month) when four paid items are automatically consumed. Also, for example, the awarding unit 54 usually adds the stamina upper limit value to the current stamina value when one paid item is consumed, but will add a value higher than the stamina upper limit value to the current stamina value when one paid item is automatically consumed. Also, for example, the awarding unit 54 usually awards the player 10 characters that are drawn in a first lottery game when 50 paid items are consumed, but will award the player 11 characters that are drawn in the first lottery game when 50 paid items are automatically consumed.

If paid items are automatically consumed, the awarding unit 54 may set the value of those paid items to be lower than usual.

The control unit 56 is a functional unit for controlling the entire game. In one or more embodiments, the control unit 56 automatically executes the lottery game. Also, the control unit 56 generates a reward notification screen for notifying the player of the reward granted by the awarding unit 54.

Flow of Processing

Figure 5:
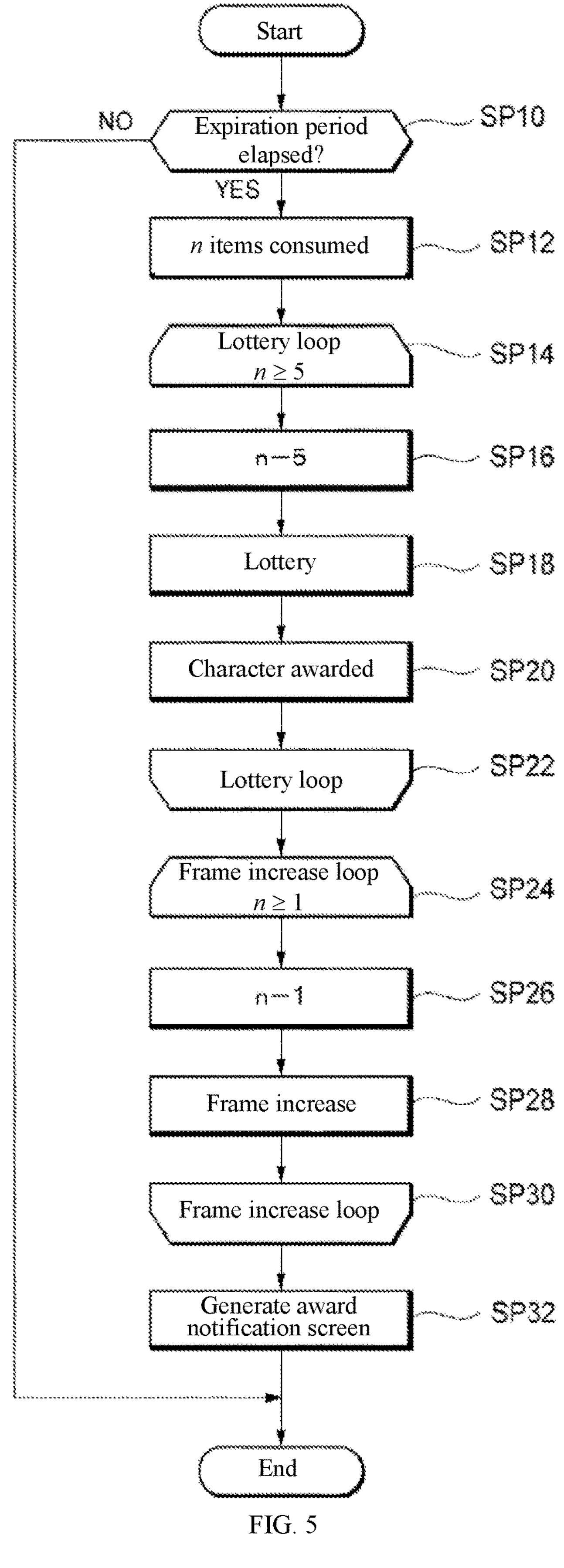
FIG. 5 is a flowchart showing an example of the flow of processing performed by each functional units shown in FIG. 4 in the game system according to one or more embodiments.

FIG. 5 is a flowchart showing an example of the flow of processing performed by each functional unit shown in FIG. 4 in the game system according to one or more embodiments. Also, the processing of the following steps is started at a specific point (such as at midnight every day), for example. The order and details of the following steps can be changed as needed.

Step SP10

The consumption unit 52 determines whether there is a paid item whose expiration period has elapsed. For example, the consumption unit 52 refers to the possessed item information in the player information 50A, identifies the paid items whose expiration period has elapsed and the number thereof, and assigns this number to the variable n (n is an integer greater than or equal to 0). If the variable n is greater than or equal to 1, the consumption unit 52 then affirms the determination. Then, if this determination is positive, the processing moves to the processing of step SP12. On the other hand, if the determination is negative, the processing ends the processing series shown in FIG. 5.

Step SP12

The consumption unit 52 automatically consumes the paid items (n items) specified in step SP10. For example, the consumption unit 52 deletes the specified paid items (n items) from the possessed item information in the player information 50A. Then, the processing moves to the processing of step S14.

Step SP14

The control unit 56 determines whether to start a lottery loop for executing a lottery game. For example, the control unit 56 affirms the determination if the variable n is at least 5. Then, if the determination is positive, the processing then moves to the processing of step SP16. On the other hand, if the determination is negative, the processing moves to the processing of step SP24.

Step SP16

The control unit 56 subtracts 5 from the variable n. Then, the processing moves to the processing of step SP18.

Step SP18

The control unit 56 automatically executes a specific lottery game. For example, the control unit 56 draws (randomly selects) a character from the group of characters eligible for drawing in the first lottery game. Then, the processing moves to the processing of step SP20.

Step SP20

The awarding unit 54 grants the player the character drawn in step SP18 as a reward. For example, the awarding unit 54 adds the drawn character to the possessed character information in the player information 50A. Then, the processing moves to the processing of step SP22.

Step SP22

The processing moves to step SP14 to repeat the lottery loop.

Step SP24

The control unit 56 determines whether to start a frame increase loop for executing an increase (expansion) of the ownership frame. For example, the control unit 56 affirms the determination if the variable n is at least 1. Then, if the determination is positive, the processing then moves to the processing of step SP26. On the other hand, if the determination is negative, the processing moves to the processing of step SP32.

Step SP26

The control unit 56 subtracts 1 from the variable n. Then, the processing moves to the processing of step SP28.

Step SP28

The awarding unit 54 automatically increases the player's ownership frame as a reward. For example, the awarding unit 54 increases (expands) the ownership frame of the possessed character information in the player information 50A by five frames. Then, the processing moves to the processing of step SP30.

Step SP30

The processing moves to step SP24 to repeat the frame increase loop.

Step SP32

The control unit 56 generates a reward notification screen (reward notification message) indicating the character awarded in step SP20, or that the ownership frame was increased in step SP28. This reward notification screen is displayed, for example, when the player opens a reward notification message from a list of received messages after logging into the game.

Figure 6:
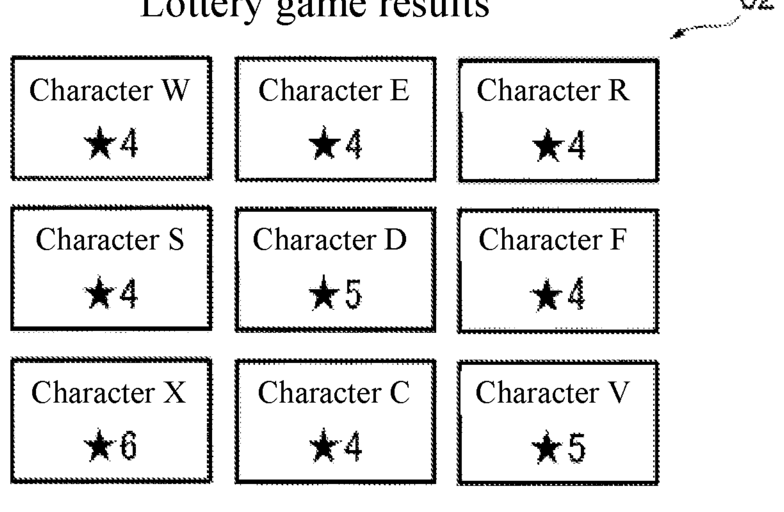
FIG. 6 is a diagram showing an example of a reward notification screen according to one or more embodiments.

FIG. 6 is a diagram showing an example of the reward notification screen 60 according to one or more embodiments.

As shown in FIG. 6, the reward notification screen 60 is provided with a reward notification information area 62 and a confirmation button 64. In the reward information area 62 is shown the reward granted to the player when the expiration period elapses. For example, the reward information area 62 may display the name and rarity of the characters awarded as a result of an automatically executed lottery game, or may display the numerical value of the pre-increase ownership frame and the post-increase ownership frame as a result of an increase in the ownership frame. The confirmation button 64 is used to notify the server device 10 that the reward notification message has been confirmed, and to return to the received message list screen.

Then, the processing ends the processing series shown in FIG. 5.

Technical Improvements

As described above, one or more embodiments provide a non-transitory computer readable recording medium storing instructions that cause a computer to execute: storing the possessed item information including the paid item possessed by the player and the expiration period of the paid item, automatically consuming the paid item with a lapse of the expiration period and removing the paid item from the possessed item information in the storage, and upon automatically consuming the paid item, granting the player a reward related to the game.

This configuration enables ensuring an available capacity of a storage while giving satisfaction to the player by granting the reward. Also, the player can be motivated to purchase the paid item even though the paid item is consumed with the lapse of the expiration period.

Also, in one or more embodiments, the reward does not have an expiration period.

With this configuration, since the expiration period is not associated with the rewards granted to the player, management of player information by the game operator can be kept from becoming overly complicated.

Also, in one or more embodiments, the storage unit 50 stores player information for the player, and the reward is to change a portion of the player information to be more advantageous for the player.

With this configuration, even though the expiration period of a paid item has elapsed, a portion of the player information is changed to be more advantageous for the player, which motivates the player to continue playing the game.

Also, in one or more embodiments, the player information includes an ownership frame that is the upper limit of the number of contents that a player can possess, and the reward is to increase the ownership frame.

With this configuration, even though the expiration period of a paid item has elapsed, the player's ownership frame is increased, which motivates the player to continue playing the game.

Also, in one or more embodiments, the player information includes information indicating whether the player is a special member having paid a fixed fee set at specific intervals, and the reward is to make the player the special member.

With this configuration, even though the expiration period of a paid item has elapsed, the player is made the special member, which motivates the player to continue playing the game.

Also, in one or more embodiments, the player information includes the current stamina value consumed upon execution of a quest in the game, and the reward is to increase the current stamina value.

With this configuration, even though the expiration period of a paid item has elapsed, the current stamina value of the player is increased, which motivates the player to consume the current stamina value and play the game.

Also, in one or more embodiments, the game includes a lottery game in which the player can acquire one or more randomly selected contents from the lottery target content group, and the reward is one or more contents drawn in the lottery game.

With this configuration, even though the expiration period of a paid item has elapsed, the content drawn in the lottery game is awarded, which motivates the player to play the game using that content.

Also, in one or more embodiments, the reward is a free item that can be consumed in the game in a same way as the paid item.

With this configuration, even though the expiration period of a paid item has elapsed, free items that can be consumed in the game just the same as paid items are awarded, which motivates the player to play the game using those free items.

Also, in one or more embodiments, the awarding unit 54 grants a larger amount of the free item than the automatically consumed paid item.

With this configuration, even though the expiration period of a paid item has elapsed, the larger amount of the free item are awarded than the automatically consumed paid item, which motivates the player to play the game using those free items.

Also, in one or more embodiments, the reward is a content that can be purchased by consuming the paid item in the game.

With this configuration, even though the expiration period of a paid item has elapsed, the content that can be purchased in the purchase game is awarded, which motivates the player to play the game using that content.

Also, in one or more embodiments, the awarding unit 54 increases the amount of the reward in proportion to the amount (or the number) of paid items that are automatically consumed.

With this configuration, even though the expiration period of many of the paid items possessed by the player has elapsed, many rewards are granted, which motivates the player to continue playing the game.

Modifications

The present invention is not limited to or by the above specific examples. That is, suitable design changes made to the above specific examples by a person skilled in the art are also encompassed by the scope of the present invention as long as they still have the features of the present invention. Also, the elements of the embodiments described above and the modified examples (discussed below) can be combined to an extent that this is technically possible, and these combinations are also encompassed by the scope of the present invention as long as they still have the features of the present invention.

For example, in one or more embodiments, an example was given in which the consumption unit 52 determined at midnight every day whether there was a paid item whose expiration period had elapsed, but the determination may instead be made at midnight every Monday, at midnight on the first of each month, or the like.

Also, in one or more embodiments, an example was given in which the awarding unit 54 granted a reward when the consumption unit 52 determined that the expiration period had elapsed, but the awarding unit 54 may instead grant a reward when the player checks the reward notification screen.

Also, in one or more embodiments, an example was given in which the awarding unit 54 granted a reward predetermined by the game operator, but it may instead grant a reward selected in advance by the player. For example, when purchasing a paid item, the player pre-selects a reward that will be granted when the expiration period of that paid item elapses.

Also, in one or more embodiments, an example was given in which the awarding unit 54 increased the amount of the reward in proportion to the amount of paid items automatically consumed, but it may instead increase the quality of the reward. For example, the awarding unit 54 may increase the quality (such as rarity) of content to be granted in a lottery game or purchase game in proportion to the amount of paid items that are automatically consumed.

Also, in one or more embodiments, a case was mainly described in which the content was a character or an item, but the content may instead be a weapon, armor, card, avatar, coin, point, etc.

Although the disclosure has been described with respect to only a limited number of embodiments, those skilled in the art, having benefit of this disclosure, will appreciate that various other embodiments may be devised without departing from the scope of the present invention.

Accordingly, the scope of the invention should be limited only by the attached claims.

REFERENCE SIGNS LIST

10 . . . server device (computer), 12 . . . terminal device, 50 . . . storage unit, 52 . . . consumption unit, 54 . . . awarding unit

What is claimed is:

1. A non-transitory computer readable recording medium storing instructions executable by an information processing device that communicates with a terminal device comprising a display via a network, the instructions causing the computer to execute:

causing the terminal device to execute a game in which a player can acquire paid items by taking a purchase procedure;

causing the terminal device to display, on a display, a reward notification screen showing an ownership frame that is an upper limit of a number of contents that the player can possess;

storing, in a storage, possessed item information including a paid item possessed by the player and an expiration period of the paid item;

automatically removing the paid item from the possessed item information in the storage such that the paid item is consumed with a lapse of the expiration period; and upon automatically removing the paid item, increasing the ownership frame as a reward related to the game, and updating the ownership frame shown on the reward notification screen.

2. The non-transitory computer readable recording medium according to claim 1, wherein the reward does not have an expiration period.

3. The non-transitory computer readable recording medium according to claim 2, wherein the instructions further cause the computer to execute: storing player information for the player, and the reward includes changing a portion of the player information to improve treatment for the player.

4. The non-transitory computer readable recording medium according to claim 3, wherein the player information includes information indicating whether the player is a special member having paid a fixed fee set at specific intervals, and the reward includes making the player the special member.

5. The non-transitory computer readable recording medium according to claim 3, wherein the player information includes a current stamina value consumed upon execution of a quest in the game, and the reward includes increasing the current stamina value.

6. The non-transitory computer readable recording medium according to claim 2, wherein the game includes a lottery game that gives the player one or more randomly selected contents from a lottery target content group, and the reward includes one or more contents drawn in the lottery game.

7. The non-transitory computer readable recording medium according to claim 2, wherein the reward includes a free item that can be consumed in the game in a same way as the paid item.

8. The non-transitory computer readable recording medium according to claim 7, wherein the instructions further cause the computer to execute:

grants a larger amount of the free item than the automatically consumed paid item.

9. The non-transitory computer readable recording medium according to claim 2, wherein the reward includes a content that can be purchased by consuming the paid item in the game.

10. The non-transitory computer readable recording medium according to claim 1, wherein the instructions further cause the computer to execute:

increasing an amount of the reward in proportion to an amount of the automatically consumed paid item.

11. An information processing device that communicates with a terminal device comprising a display via a network, the information processing device comprising:

a storage; and a control device that:

causes the terminal device to execute a game in which a player can acquire paid items by taking a purchase procedure, causes the terminal device to display, on a display, a reward notification screen showing an ownership frame that is an upper limit of a number of the paid items that the player can possess, stores, in a storage, player information and possessed item information including a paid item possessed by the player and an expiration period of the paid item, automatically removes the paid item from the possessed item information in the storage such that the paid item is consumed with a lapse of the expiration period, and upon automatically consuming the paid item, updates the player information to reflect a reward related to the game, and updates the ownership frame on the reward notification screen to indicate the number of the paid items that the player can possess after the paid item is removed.

12. The non-transitory computer readable recording medium according to claim 1, wherein the reward notification screen indicates a message that the paid item was consumed with the lapse of the expiration period.

13. The non-transitory computer readable recording medium according to claim 1, wherein the instructions further cause the computer to execute:

upon automatically removing the paid item, executing a lottery game that gives the player one or more randomly selected contents from a lottery target content group, and the reward notification screen indicates the randomly selected contents given to the player.

* * * * *